United States Patent
Boecker et al.

(10) Patent No.: US 8,447,921 B2
(45) Date of Patent: May 21, 2013

(54) RECOVERING FAILED WRITES TO VITAL PRODUCT DATA DEVICES

(75) Inventors: Douglas M. Boecker, Rochester, MN (US); Brent W. Jacobs, Rochester, MN (US); Nathan D. Miller, Rochester, MN (US); Matthew S. Spinler, Rochester, MN (US); Shaun A. Wetzstein, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/008,047

(22) Filed: Jan. 18, 2011

(65) Prior Publication Data

US 2012/0185637 A1    Jul. 19, 2012

(51) Int. Cl.
*G06F 13/00*    (2006.01)
*G06F 13/28*    (2006.01)

(52) U.S. Cl.
USPC .......................................... 711/103; 711/141

(58) Field of Classification Search
None
See application file for complete search history.

(56) References Cited

U.S. PATENT DOCUMENTS

| 5,488,711 A | 1/1996 | Hewitt et al. |
| 7,107,414 B2 * | 9/2006 | Hidai et al. .................... 711/154 |
| 2010/0312750 A1 * | 12/2010 | Moore et al. .................. 707/623 |

OTHER PUBLICATIONS http://www.thefreedictionary.com/synchronize, 2003, p. 1.*
EmbeddedRelated.com, "How to design non blocking device drivers?" http://www.embeddedrelated.com/usenet/embedded/show/99559-1.php.

* cited by examiner

*Primary Examiner* — Charles Rones
*Assistant Examiner* — Sidney Li
(74) *Attorney, Agent, or Firm* — Rabin & Berdo, P.C.

(57) ABSTRACT

A method for maintaining vital product data (VPD) contained in an EEPROM (Electrically Erasable Programmable Read-Only Memory) on a field replaceable unit (FRU) of a computer system that has a cache. The method includes maintaining a copy of the VPD in the cache, retrieving the copy of the VPD from the cache upon receiving a read request of the VPD, and, upon receiving a write request to write data to the VPD, writing the data to the copy of the VPD, determining whether the VPD in the EEPROM is in synchronization with the copy of the VPD in the cache, and, if the VPD and the copy of the VPD are in synchronization, writing the data to the EEPROM.

20 Claims, 5 Drawing Sheets

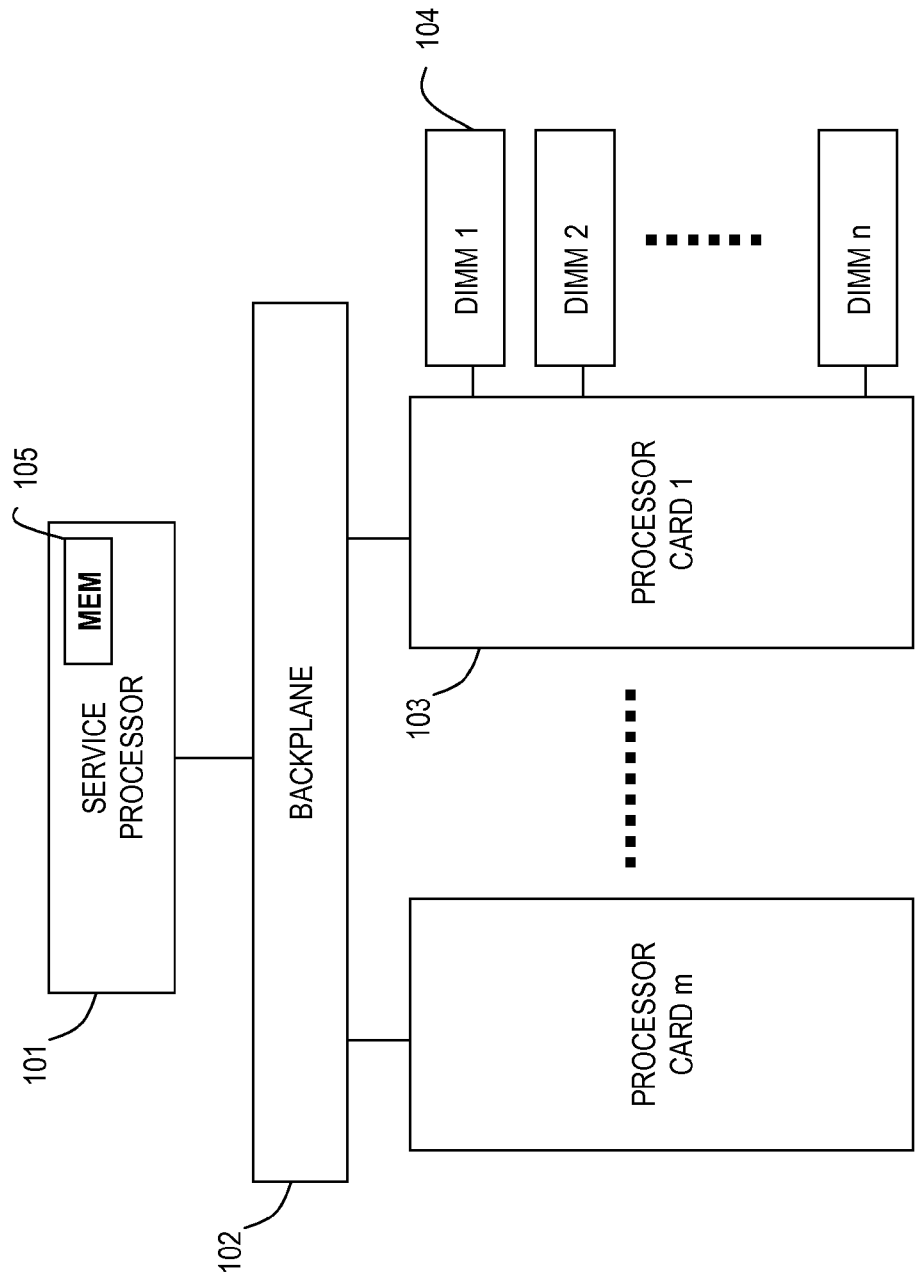

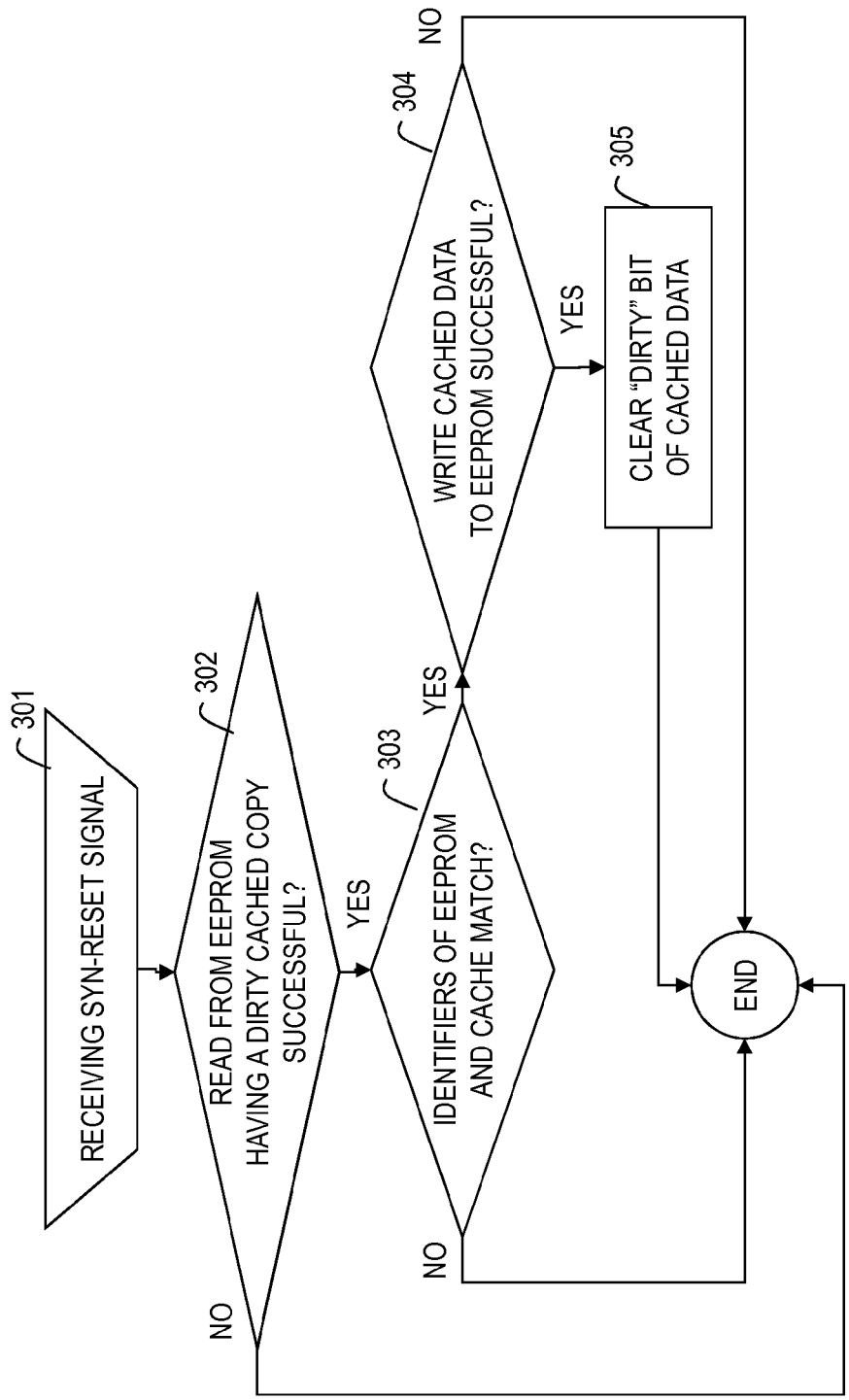

RECOVERING FAILED WRITES TO VITAL PRODUCT DATA DEVICES

BACKGROUND

1. Technical Field

The present invention relates to computer system maintenance. More specifically, it relates to a method for maintaining writes to vital product data (VPD) of field replaceable units (FRUs) in a computer system, and recovering failed writes to the FRUs.

2. Background Information

A computer system is composed of many FRUs, namely, circuit boards or parts that can be easily removed from the computer system and replaced, even by someone lacking in-depth product knowledge of the computer system. These FRUs include power supply units, motherboards, socketed microprocessors, primary storage modules (e.g. Radom Access Memories, or RAMs), secondary storage devices (e.g. hard drives and optical drives), video cards, sound cards, and peripherals such as keyboards, mice and printers. Replacing a FRU while the machine is running is known as hot swapping.

Many FRUs have VPD stored thereon that is vital to the setup or configuration of the computer system. The VPD is a collection of configuration and informational data associated with a particular set of hardware (e.g. a FRU), to allow for the set of hardware to be administered at a system or network level. The VPDs are used by a computer system to determine the nature of a specific hardware, and to shield the operation of the computer system from minor changes and variations of hardware implementations. VPDs may include product model numbers, unique serial numbers, product release levels, maintenance levels, and other information specific to the hardware, as well as user-defined information, such as the building and department location of the hardware. Some of the VPDs are updated periodically. For example, statistics such as power-on time or redundant memory bit steering information.

FRUs exist throughout the computer system, and are sometimes connected in series. Therefore, multiple FRUs usually lie intermediately in the path to access the VPD stored on a destination EEPROM (Electrically Erasable Programmable Read-Only Memory) on one FRU. As such, any problem in any one of the intermediate FRUs can lead to the problem of updating the destination EEPROM, even though the FRU containing the destination EEPROM remains functional. One solution to this problem is to treat any write failure to the destination EEPROM as a failure of the EEPROM, and to disallow any future reads from or writes to the EEPROM. Other solutions include providing alternate paths to the destination EEPROM.

SUMMARY

A method for maintaining vital product data (VPD) contained in an EEPROM (Electrically Erasable Programmable Read-Only Memory) on a field replaceable unit (FRU) of a computer system that has a cache. The method includes maintaining a copy of the VPD in the cache, retrieving the copy of the VPD from the cache upon receiving a read request of the VPD, and, upon receiving a write request to write data to the VPD, writing the data to the copy of the VPD, determining whether the VPD in the EEPROM is in synchronization with the copy of the VPD in the cache, and, if the VPD and the copy of the VPD are in synchronization, writing the data to the EEPROM.

BRIEF DESCRIPTION OF DRAWINGS

FIG. 1 shows a computer system with a centrally located non-volatile memory in one embodiment of the invention.

FIG. 3 illustrates the process of synchronizing the cached VPDs and the VPDs on the FRUs in one embodiment of the invention.

DETAILED DESCRIPTION

Figure 2A:
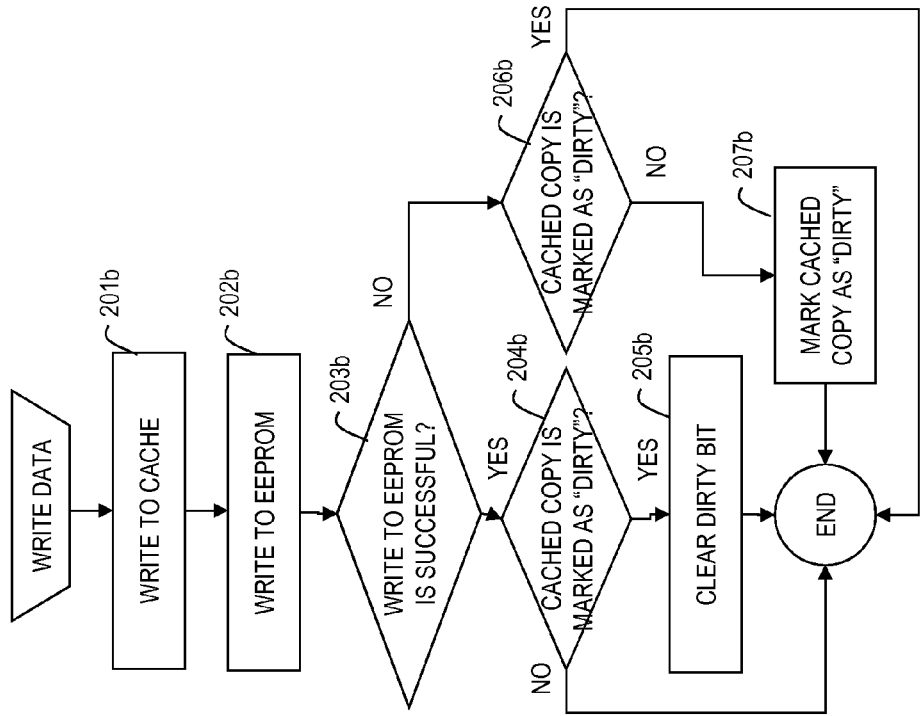
FIGS. 2A and 2B respectively illustrate a write process of accessing VPD of one FRU in two embodiments of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment of the present invention, a cached copy of the VPD contained in the EEPROM on each FRU is stored in a non-volatile memory at a location central to the FRUs, for example, in the service processor for IBM computer servers. A VPD write to an EEPROM is first written to the cached copy at the central location, followed by a write to the actual EEPROM. If the write to the EEPROM is not successful, the cached copy is marked as "dirty". The cached copy remains "dirty" until a successful read of the EEPROM occurs, the FRU on which the EEPROM is formed is verified to be functional (e.g. when the FRU has been replaced), and a write of the cached copy of the VPD to the FRU has succeeded. If the read of the EEPROM confirms the FRU is functional, the cached copy of the VPD is written out to the EEPROM.

FIG. 1 shows a computer system with a centrally located non-volatile memory in exemplar embodiment of the invention. The computer system of FIG. 1 includes a service processor 101 connected to a backplane 102. A plurality of processor cards 103 are plugged into the backplane 102. Each processor card 103 has a plurality of DIMMs (Dual In-line Memory Modules) plugged therein. All of the service processor 101, the backplane 102, the processor cards 103 and the DIMMs 104 are FRUs, and each thus has its own VPD stored in an EEPROM formed thereon (not shown in FIG. 1). The service processor 101, which is central to all the FRUs, has a non-volatile memory 105. A cached copy of the VPD stored in the EEPROM of each of the service processor 101, the backplane 102, the processor cards 103 and the DIMMs 104 is kept on the non-volatile memory 105.

FIG. 2A illustrates a write process of accessing VPD of one FRU in one embodiment of the invention. When an application tries to write new data to the EEPROM of a FRU, as illustrated in FIG. 2A, the data is first written into the cache (step 201a). If prior writes to the EEPROM have been successful (i.e. the cache copy is not marked as "dirty," as in step 202a), the data is subsequently written into the EEPROM (step 203a). A successful write to the EEPROM ends the write process (step 204a). However, if the write to the EEPROM is not successful, e.g. due to a hardware failure of a FRU, the cached copy of the VPD in the non-volatile memory 105 is marked as "dirty" (step 205a). The hardware failure could be that of the destination FRU on which the EEPROM is formed, or that of another FRU in the path to access the destination FRU. For example, if one of the DIMMs 104 is the destination FRU, the failure to access the EEPROM on the DIMM 104 could be caused by the hardware failure of the DIMM 104 itself, or by a hardware failure of any of the intermediate FRUs including the service processor 101, the backplane 102 and the processor cards 103. Any of the above hardware failures would lead to a "dirty" cached copy of the VPD in the non-volatile memory 105 for the DIMM 104. However, when the cached copy of the VPD in the non-volatile memory 105 is "dirty" (step 202a), a write to the EEPROM goes to the cache only, and no attempt will be made to write the EEPROM.

Figure 2B:
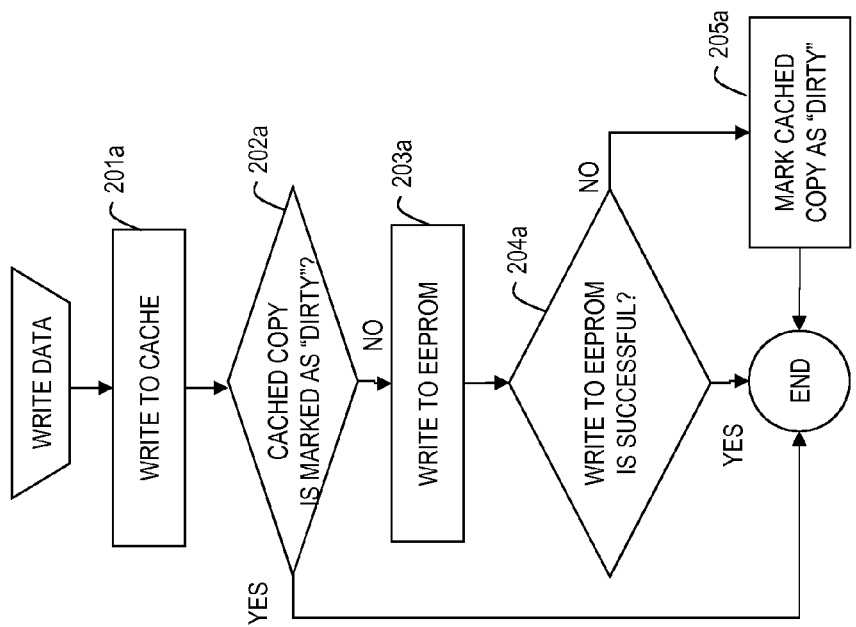

FIG. 2B illustrates a write process of accessing VPD of one FRU in an alternative embodiment of the invention. When an application tries to write new data to the EEPROM of a FRU, as illustrated in FIG. 2B, the data is first written into the cache (step 201b). An attempt is subsequently made to write the data into the EEPROM (step 202b). If the write to the EEPROM is not successful (step 203b), the cached copy of the VPD in the non-volatile memory 105 will be marked as "dirty" (step 207b), if it is not already so marked (step 206b). If, on the other hand, the write to the EEPROM succeeds, the cached copy will be checked to determine whether it is marked as "dirty" (step 204b). If the cached copy is not "dirty," the write process will end; otherwise, the label indicating the cached copy is "dirty" (i.e. a "dirty" bit) will be cleared (step 205b). This write process is beneficial in situations where the write failures are intermitted, and the write may work without requiring any change in the hardware.

Figure 2C:
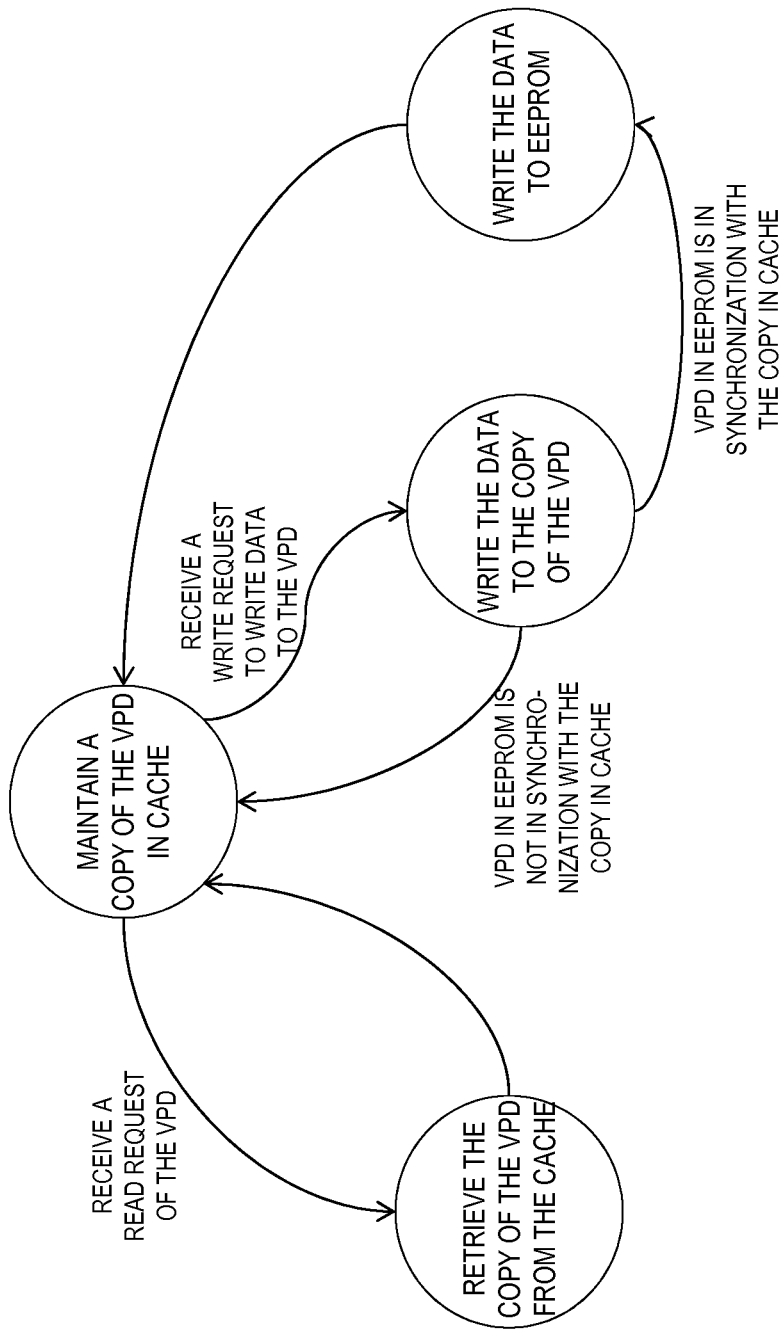
FIG. 2C illustrates a state diagram Showing a read process and a write process of FIG. 2A.

Since, as demonstrated in the above writing processes, a cached copy of VPD in the non-volatile memory 105 is always the most updated copy of the VPD, a read of the VPD always accesses the non-volatile memory 105 (unless in the recovering process as described below), and obtains the VPD from the cached copy stored therein. FIG. 2C illustrates a state diagram that shows such a read process, as well as the write Process of FIG. 2A. Specifically, as shown in FIG. 2C, a copy of the VPD is maintained in the cache; upon receipt of a read request of the VPD, the copy of the VPD is retrieved from the cache; and upon receipt of a write request to write data to the VPD, the data is written to the copy of the VPD, and subsequently a determination is made as to whether the VPD in the EEPROM is in synchronization with the copy of the VPD in the cache, and the data is written to the EEPROM if the VPD abd the copy of the VPD are in synchronization.

FIG. 3 illustrates the process of synchronizing the cached VPDs and the VPDs on the FRUs. A synchronization reset signal, such as a power on reset indicating the service processor 101 was powered off, or some other software signal indicating a FRU replacement or configuration change (e.g. when an unplugged cable is now plugged), triggers VPD validation. Once the synchronization reset signal is received (step 301), the service processor 101 reads from the EEPROM for each FRU that has a "dirty" cached copy of VPD in the non-volatile memory 105 (step 302). If the service processor 101 is able to successfully read from one such EEPROM, and a unique identifier (such as the serial number) of the VPD from the EEPROM matches that of the VPD in the cache (step 303), then a write of the cached data out to the EEPROM will be attempted (step 304). If the write to the EEPROM is successful, then "dirty" cached copy (i.e. the dirty bit of the cached copy) is cleared (step 305). If, however, the read of the VPD from the EEPROM in step 302, the check for matching identifiers in step 303, or the write of the cached VPD to the EEPROM in step 304 is not successful, the cached copy for the FRU is maintained and remains "dirty".

In one embodiment of the invention, the synchronization is performed by a process called VPD collection. The VPD collection process occurs after a reset of the service processor or some other indication (e.g. such as from a user) that a FRU might have been changed. As part of that collection process, the VPD is read from the EEPROM on each FRU in the system. The VPD read from the EEPROM is compared against the cached data for that given FRU. If the FRU currently installed has the same VPD as a copy in the cache (e.g. by comparing their serial number), then the VPD collection process determines if the cached data for that FRU is "dirty". If so, the data is written out and the "dirty" bit cleared. If, however, the cached copies of the VPDs do not include that of the FRU that is currently installed, the VPD for the newly installed FRU is cached, and the cached VPD for the replaced FRU is discarded. This would also in effect clear the "dirty" bit.

Therefore, the present invention enables a user of a computer system to continue to use updated and correct VPD from the cache, especially when the failing FRU is not the destination FRU, but some intermediate FRU in the path. The VPD continues to be maintained and updated, allowing functions dependent on that VPD to keep operating. Moreover, only checking to see if the "dirty" cache can be pushed out to the EEPROM when a read of the EEPROM occurs saves in performance, as compared to continuous checking of whether or not the failing FRU has been fixed.

Figure 4:
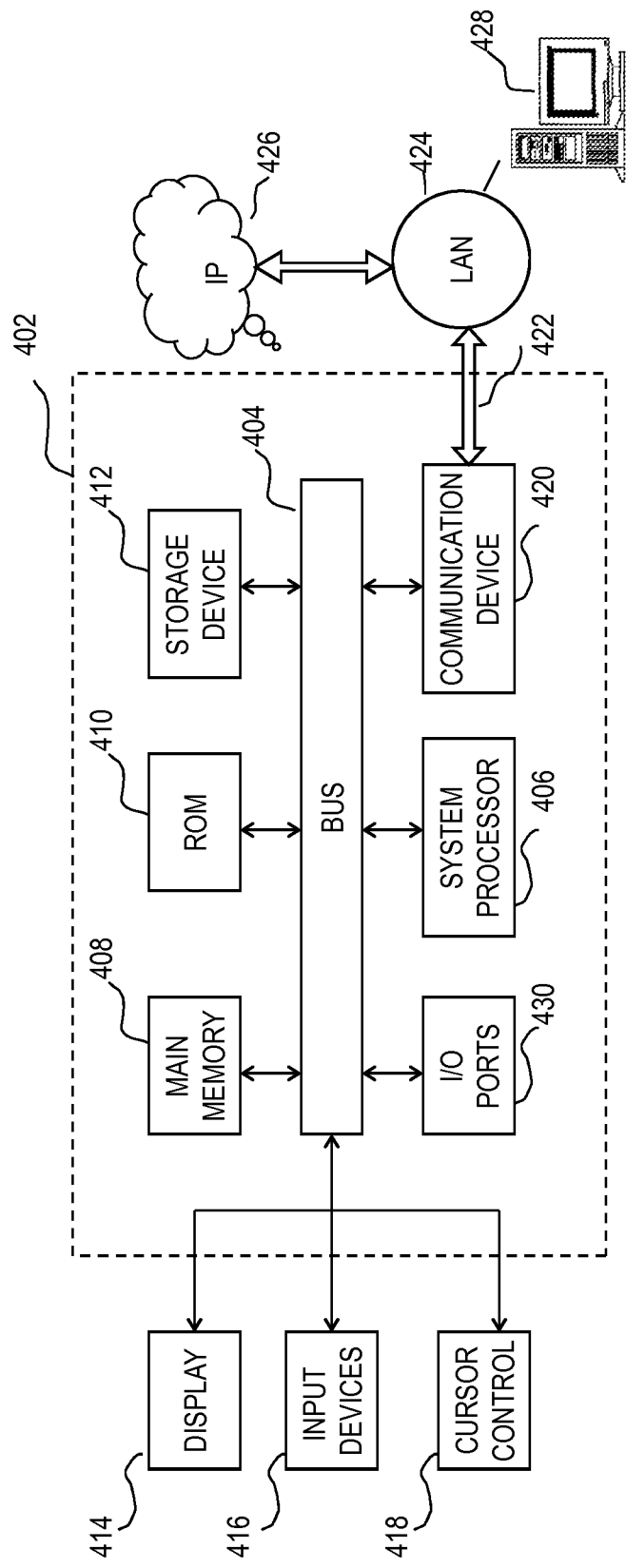
FIG. 4 illustrates a computer system upon which the present invention may be implemented.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIGS. 1-3. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (428) through local network (424) (e.g., a LAN) or through equipment operated by a service provider, which provides communication services through a communications network (426). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for maintaining vital product data (VPD) contained in an EEPROM (Electrically Erasable Programmable Read-Only Memory) on a field replaceable unit (FRU) of a computer system, the computer system having a cache, comprising:
   maintaining a copy of the VPD in the cache;
   upon receiving a read request of the VPD, retrieving the copy of the VPD from the cache; and
   upon receiving a write request to write data to the VPD,
      writing the data to the copy of the VPD,
      determining whether the VPD in the EEPROM is in synchronization with the copy of the VPD in the cache, and
      writing the data to the EEPROM, if the VPD and the copy of the VPD are in synchronization.

2. The method of claim 1, further comprising, if said writing the data to the EEPROM fails, setting a flag indicating that the VPD in the EEPROM and the copy of the VPD in the cache are out of synchronization.

3. The method of claim 2, wherein the determining includes checking the flag.

4. The method of claim 1, wherein the determining and the writing the data to the EEPROM include:
   attempting to write the data to the EEPROM,
   concluding the VPD in the EEPROM is in synchronization with the copy of the VPD if the attempt succeeds, and
   concluding the VPD in the EEPROM is out of synchronization with the copy of the VPD if the attempt fails.

5. The method of claim 1, further comprising synchronizing the VPD in the EEPROM and the copy of the VPD in the cache, upon receiving a signal indicating a change of the FRU.

6. The method of claim 5, wherein the synchronizing includes:
   reading the VPD from the EEPROM;
   comparing a first identifier of the VPD from the EEPROM and a second identifier of the copy of the VPD in the cache; and
   if the first and second identifiers match, writing the copy of the VPD to the EEPROM.

7. The method of claim 6, wherein said writing the copy of the VPD further includes clearing a flag to indicate that the VPD in the EEPROM and the copy of the VPD in the cache are in synchronization.

8. A computer program product to maintain vital product data (VPD) contained in an EEPROM (Electrically Erasable Programmable Read-Only Memory) on a field replaceable unit (FRU) of a computer system, the computer system having a cache, the computer program product comprising:
   a non-transitory computer usable medium having computer usable program code embodied therewith, the computer usable program code comprising:
      instructions to maintain a copy of the VPD in the cache;
      instructions to, upon receiving a read request of the VPD, retrieve the copy of the VPD from the cache; and
   instructions to, upon receiving a write request to write data to the VPD,
      write the data to the copy of the VPD,
      determine whether the VPD in the EEPROM is in synchronization with the copy of the VPD in the cache, and
      write the data to the EEPROM, if the VPD and the copy of the VPD are in synchronization.

9. The computer program product of claim 8, further comprising instructions to, if said writing the data to the EEPROM fails, set a flag indicating that the VPD in the EEPROM and the copy of the VPD in the cache are out of synchronization.

10. The computer program product of claim 9, wherein the instructions to determine include instructions to check the flag.

11. The computer program product of claim 9, wherein the instructions to determine and to write the data to the EEPROM include:
  instructions to attempt to write the data to the EEPROM,
  instructions to conclude the VPD in the EEPROM is in synchronization with the copy of the VPD if the attempt succeeds, and
  instructions to conclude the VPD in the EEPROM is out of synchronization with the copy of the VPD if the attempt fails.

12. The computer program product of claim 8, further comprising instructions to synchronize the VPD in the EEPROM and the copy of the VPD in the cache, upon receiving a signal indicating a change of the FRU.

13. The computer program product of claim 12, wherein the instructions to synchronize include:
  instructions to read the VPD from the EEPROM;
  instructions to compare a first identifier of the VPD from the EEPROM and a second identifier of the copy of the VPD in the cache; and
  instructions to, if the first and second identifiers match, write the copy of the VPD to the EEPROM.

14. The computer program product of claim 13, wherein said instructions to write the copy of the VPD further include instructions to clear a flag to indicate that the VPD in the EEPROM and the copy of the VPD in the cache are in synchronization.

15. A computer system comprising:
  a plurality of field replaceable units (FRUs), including a processor, a memory operatively coupled with the processor and having a cache, and a storage device operatively coupled with the processor and the memory, each FRU having an EEPROM (Electrically Erasable Programmable Read-Only Memory) formed thereon; and
  a computer program product to maintain vital product data (VPD) contained in the EEPROM of one of the plurality of FRUs of the computer system, the computer program product comprising:
    a non-transitory computer usable medium having computer usable program code embodied therewith, the computer usable program code comprising:
      instructions to maintain a copy of the VPD in the cache;
      instructions to, upon receiving a read request of the VPD, retrieve the copy of the VPD from the cache; and
      instructions to, upon receiving a write request to write data to the VPD,
        write the data to the copy of the VPD,
        determine whether the VPD in the EEPROM is in synchronization with the copy of the VPD in the cache, and
        write the data to the EEPROM, if the VPD and the copy of the VPD are in synchronization.

16. The computer system of claim 15, further comprising instructions to, if said writing the data to the EEPROM fails, set a flag indicating that the VPD in the EEPROM and the copy of the VPD in the cache are out of synchronization.

17. The computer system of claim 15, wherein the instructions to determine and to write the data to the EEPROM include:
  instructions to attempt to write the data to the EEPROM,
  instructions to conclude the VPD in the EEPROM is in synchronization with the copy of the VPD if the attempt succeeds, and
  instructions to conclude the VPD in the EEPROM is out of synchronization with the copy of the VPD if the attempt fails.

18. The computer system of claim 15, further comprising instructions to synchronize the VPD in the EEPROM and the copy of the VPD in the cache, upon receiving a signal indicating a change of one of the plurality of FRUs.

19. The computer system of claim 18, wherein the instructions to synchronize include:
  instructions to read the VPD from the EEPROM;
  instructions to compare a first identifier of the VPD from the EEPROM and a second identifier of the copy of the VPD in the cache; and
  instructions to, if the first and second identifiers match, write the copy of the VPD to the EEPROM.

20. The computer system of claim 19, wherein said instructions to write the copy of the VPD further include instructions to clear a flag to indicate that the VPD in the EEPROM and the copy of the VPD in the cache are in synchronization.

* * * * *